United States Patent [19]
Hisada

[11] Patent Number: 6,061,029
[45] Date of Patent: May 9, 2000

[54] VEHICLE ANTENNA APPARATUS

[75] Inventor: Masaaki Hisada, Tokyo, Japan

[73] Assignee: Mitsubishi Denki Kabushiki Kaisha, Tokyo, Japan

[21] Appl. No.: 09/235,404

[22] Filed: Jan. 22, 1999

[30] Foreign Application Priority Data

Aug. 13, 1998 [JP] Japan .................................. 10-229121

[51] Int. Cl.⁷ .................................................. H01Q 1/32
[52] U.S. Cl. .......................................... 343/713; 343/711
[58] Field of Search .................................. 343/711, 712, 343/713; 340/928

[56] References Cited

U.S. PATENT DOCUMENTS

| | | | |
|---|---|---|---|
| 4,983,984 | 1/1991 | Shibano et al. | 343/711 |
| 5,751,227 | 5/1998 | Yoshida et al. | 340/928 |

FOREIGN PATENT DOCUMENTS

64-89601  4/1989  Japan .

*Primary Examiner*—Don Wong
*Assistant Examiner*—Shih-Chao Chen
*Attorney, Agent, or Firm*—Sughrue, Mion, Zinn, Macpeak & Seas, PLLC

[57] ABSTRACT

A vehicle antenna apparatus that can prevent the antenna gain of each antenna from decreasing owing to the directivity thereof and can obtain stable input power. This vehicle antenna apparatus has a pair of antennas respectively provided in left and right door mirrors, a driving unit, which is connected to the antennas, for changing the orientations of the antennas, and a control unit which is operative to select the antenna, the input power to which is higher than the input power to the other of the pair of antennas, as an antenna for communication and is operative to control the driving unit in such a manner as to drive the pair of antennas so that the orientation of the selected antenna corresponding to higher input power is fixed and the orientation of the other antenna corresponding to lower input power is changed.

3 Claims, 8 Drawing Sheets

COMMUNICATION AREA END

VEHICLE ANTENNA APPARATUS

BACKGROUND OF THE INVENTION

1. Field of the Invention

This invention generally relates to a vehicle antenna apparatus, which is mounted on a vehicle and used in an intelligent transport system (ITS). More particularly, this invention relates to a vehicle antenna apparatus, which can prevent a reception level from being reduced owing to antenna directivity.

2. Description of the Related Art

Figure 10:
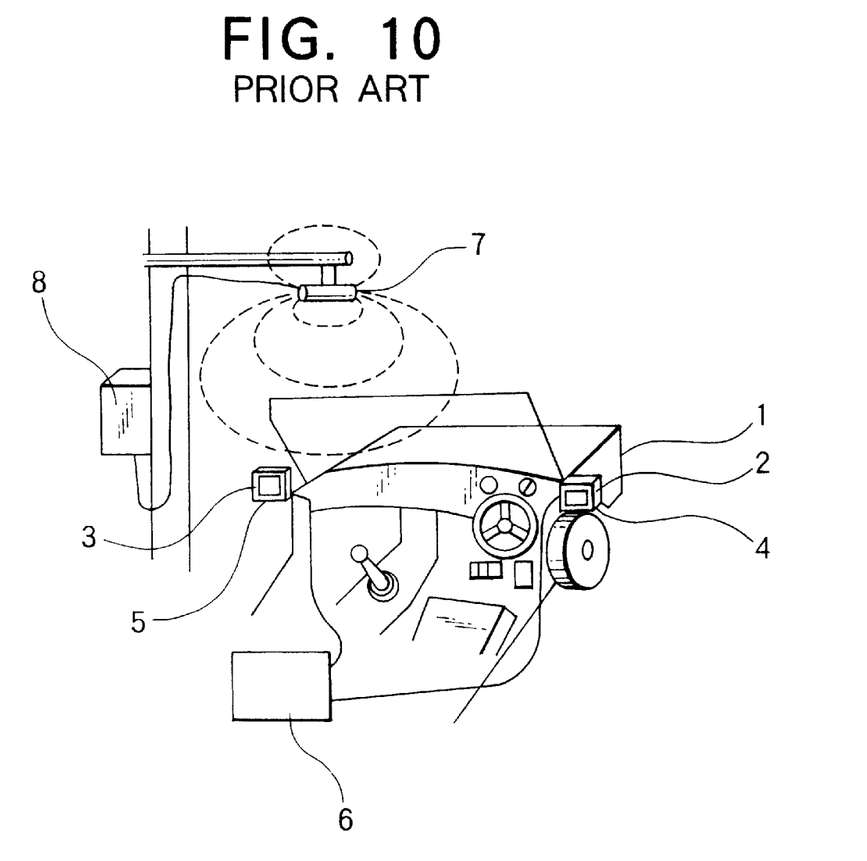
FIG. 10 is a diagram illustrating the entire configuration of the conventional vehicle antenna apparatus.

FIG. 10 is a diagram illustrating the entire configuration of a conventional vehicle antenna apparatus, which is described in, for example, Japanese Unexamined Patent Publication No. 64-89601 Official Gazette. As shown in FIG. 10, a vehicle 1 has door mirrors 2 and 3 that contain antennas 4 and 5, respectively. The antennas 4 and 5 are electrically connected to a communication device 6. On the other hand, a road device 8 provided on a road shoulder is electrically connected to a road antenna 7.

In the conventional vehicle antenna apparatus of such a configuration, the two antennas 4 and 5 acting as vehicle-mounted loop antennas are embedded in the two door mirrors 2 and 3 of the vehicle 1, respectively. Output signals of the antennas 4 and 5 are inputted to the communication device 6 through an input circuit (not shown) adapted to add the output signals. On the other hand, the road antenna 7 is installed on a post and mounted high above a road and connected to the road device 8.

The conventional vehicle antenna apparatus of such a configuration has the antennas 4 and 5, which are respectively contained in the two door mirrors 2 and 3, and has the input circuit adapted to add output signals of these antennas. Consequently, this conventional vehicle antenna apparatus achieves stable road-vehicle communication. Moreover, the appearance of the vehicle is not marred. Furthermore, the antennas 4 and 5 are mounted on the outside of a vehicle body covered with iron and glass. Thus, there is little wave loss.

Figure 11:
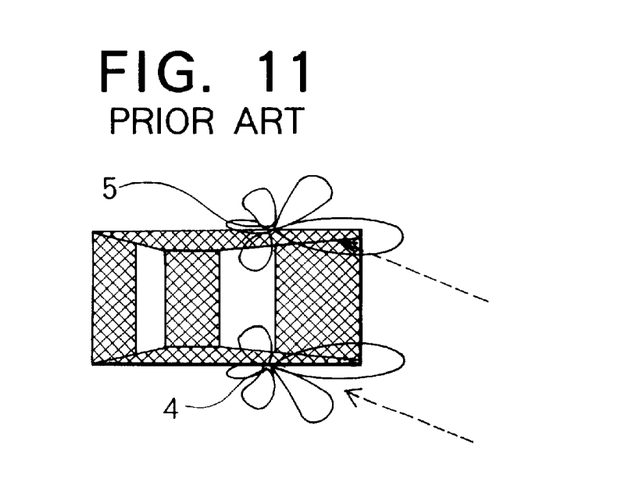
FIG. 11 is a top view of this conventional vehicle antenna apparatus, which illustrates the directivity thereof.
Figure 12:
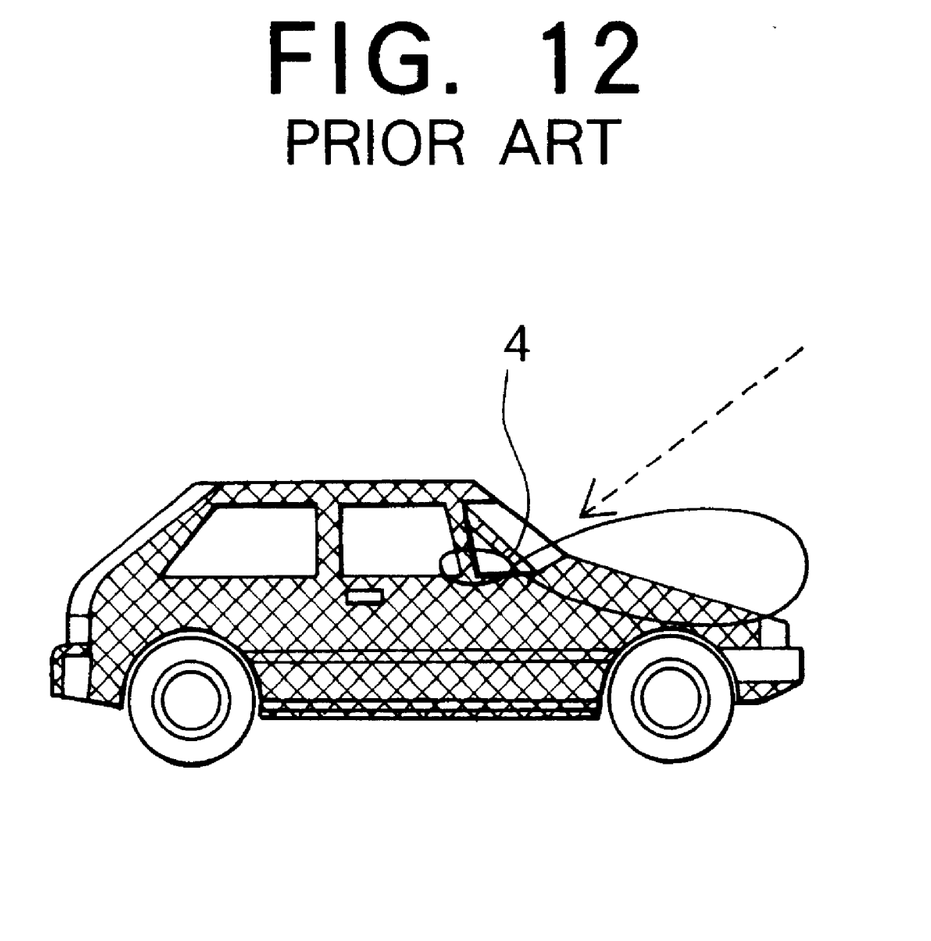
FIG. 12 is a side view of this conventional vehicle antenna apparatus, which illustrates the directivity thereof.

FIG. 11 is a top view of a vehicle, which illustrates the directivity of the conventional vehicle antenna apparatus. Further, FIG. 12 is a side view of the vehicle. In FIGS. 11 and 12, solid lines indicate the directivities of the antennas 4 and 5, namely, the ranges of reception levels thereof in specified planes, respectively. As is apparent from these figures, the directivities or reception levels of the antennas 4 and 5 have maximum values in the travelling direction of the vehicle, respectively, and vary at every predetermined angle in a horizontal plane. Further, the reception levels of these antennas are zero at some angles.

Generally, the antennas 4 and 5 have the aforementioned directivities. Thus, the reception levels reduce in the case that, as the vehicle travels, signals outputted from the road antenna 7 are transmitted from, for instance, directions of arrows drawn with dotted lines in these figure. Consequently, the antennas 4 and 5 cannot receive such signals.

In the conventional vehicle antenna apparatus of such a configuration, the antennas 4 and 5 have the directivities. Consequently, this conventional vehicle antenna apparatus has a problem in that the antenna gains of the antennas 4 and 5 are lowered owing to the directivities thereof and that the reception levels thus decrease.

This invention is accomplished to solve the problem of the conventional antenna apparatus.

Accordingly, an object of the present invention is to provide a vehicle antenna apparatus that can prevent the antenna gain of each antenna from decreasing owing to the directivity thereof and can obtain stable input power.

SUMMARY OF THE INVENTION

To achieve the foregoing object, according to the present invention, there is provided a vehicle antenna apparatus that comprises a pair of antennas respectively provided in left and right outside rear view mirrors, driving means, which are respectively connected to the antennas, for changing the orientations of the antennas, and control means having an input power comparing portion for making a comparison between a magnitude of input power to one of the pair of antennas and a magnitude of input power to the other of the pair of antennas. The control means selects the antenna, the input power to which is higher than the input power to the other of the pair of antennas, as an antenna for communication. Moreover, the control means controls the driving means in such a manner as to drive the pair of antennas so that an orientation of the selected antenna corresponding to higher input power is fixed and an orientation of the other antenna corresponding to lower input power is changed.

Thus, this vehicle antenna apparatus prevents the reception levels of the antennas from being reduced owing to the directivities of the antennas. Further, this apparatus always obtains high input power. Moreover, this apparatus seeks a higher reception input level by rotating the antenna provided on one side of the vehicle.

Further, in an embodiment of this vehicle antenna apparatus of this invention, the orientation of the antenna corresponding to the lower input power is changed within a predetermined driven range.

Thus, unnecessary motions of the antennas are eliminated. Furthermore, this vehicle antenna apparatus obtains more stable input power.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Embodiment 1

Figure 1:
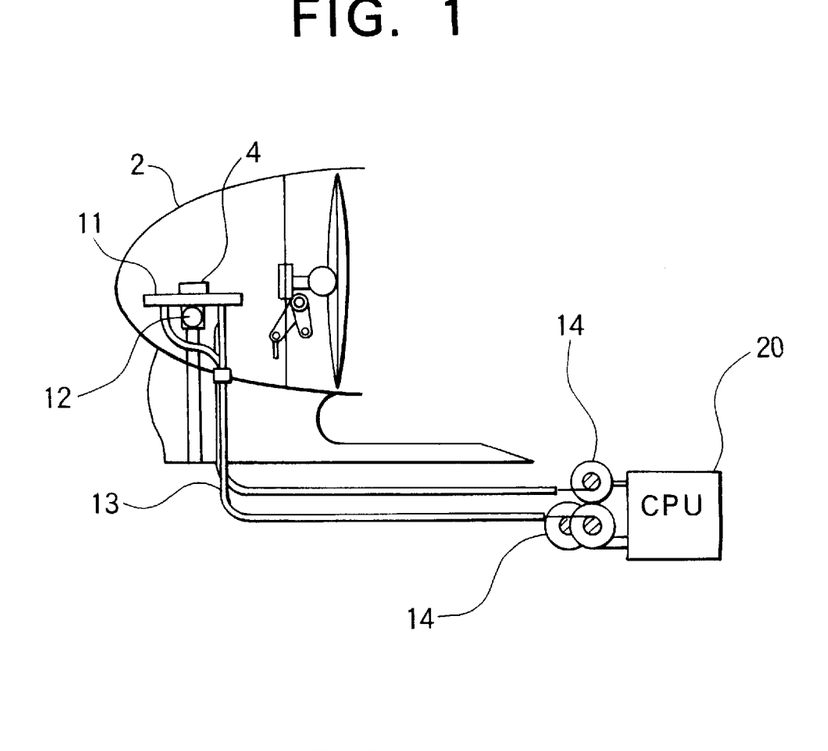
FIG. 1 is a sectional diagram showing a vehicle antenna apparatus of this invention.
Figure 2:
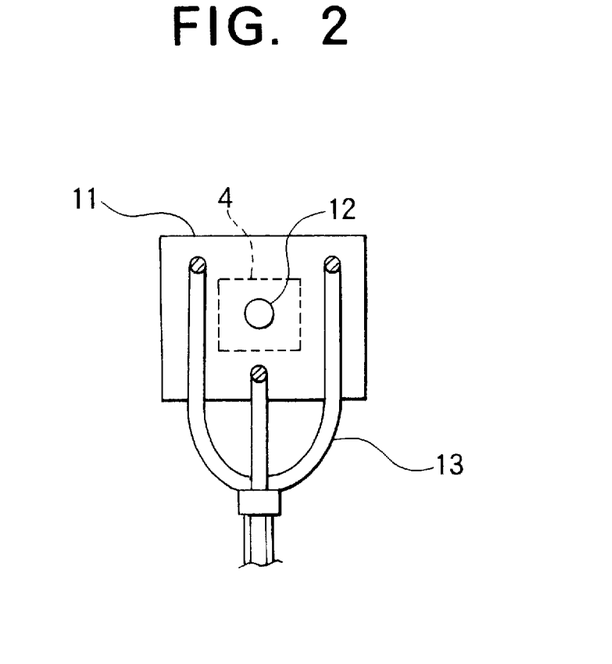
FIG. 2 is a diagram showing a part of a driving unit, which is taken from the rear surface side of an antenna supporting base.

FIG. 1 is a sectional diagram showing a vehicle antenna apparatus embodying this invention. FIG. 2 is a diagram showing a part of a driving unit, which is taken from the back surface side of an antenna supporting base. As shown in FIGS. 1 and 2, an antenna 4 of the dedicated short range communication (DSRC) type to be used in ITS is contained in a door mirror 2. The antenna 4 is fixed on the antenna supporting base 11. Further, the antenna supporting base 11 is angle-variably put on a supporting ball 12.

One ends of driving wires 13 are connected to predetermined positions on the antenna supporting base 11 around the supporting ball 12, respectively. The driving wires 13 are extended into a vehicle body. The other ends of the driving wires 13 are connected to driving motors 14, respectively. When the driving motors 14 rotate in predetermined directions by predetermined angles, respectively, the antenna supporting base 11 and the antenna 4 are turned to a predetermined direction around the supporting ball 12. The driving motors 14 constitute the driving means for changing the orientations of the antennas 4. The driving motors 14 are electrically connected to and controlled by CPU 20 (to be described in detail later) acting as the control means.

Incidentally, although only the door mirror 2 provided on one side of the vehicle is shown in these figures, the door mirror 3 provided on the other side thereof has an approximately similar structure. The other antenna 5 is similarly put on the antenna supporting base 11.

Figure 3:
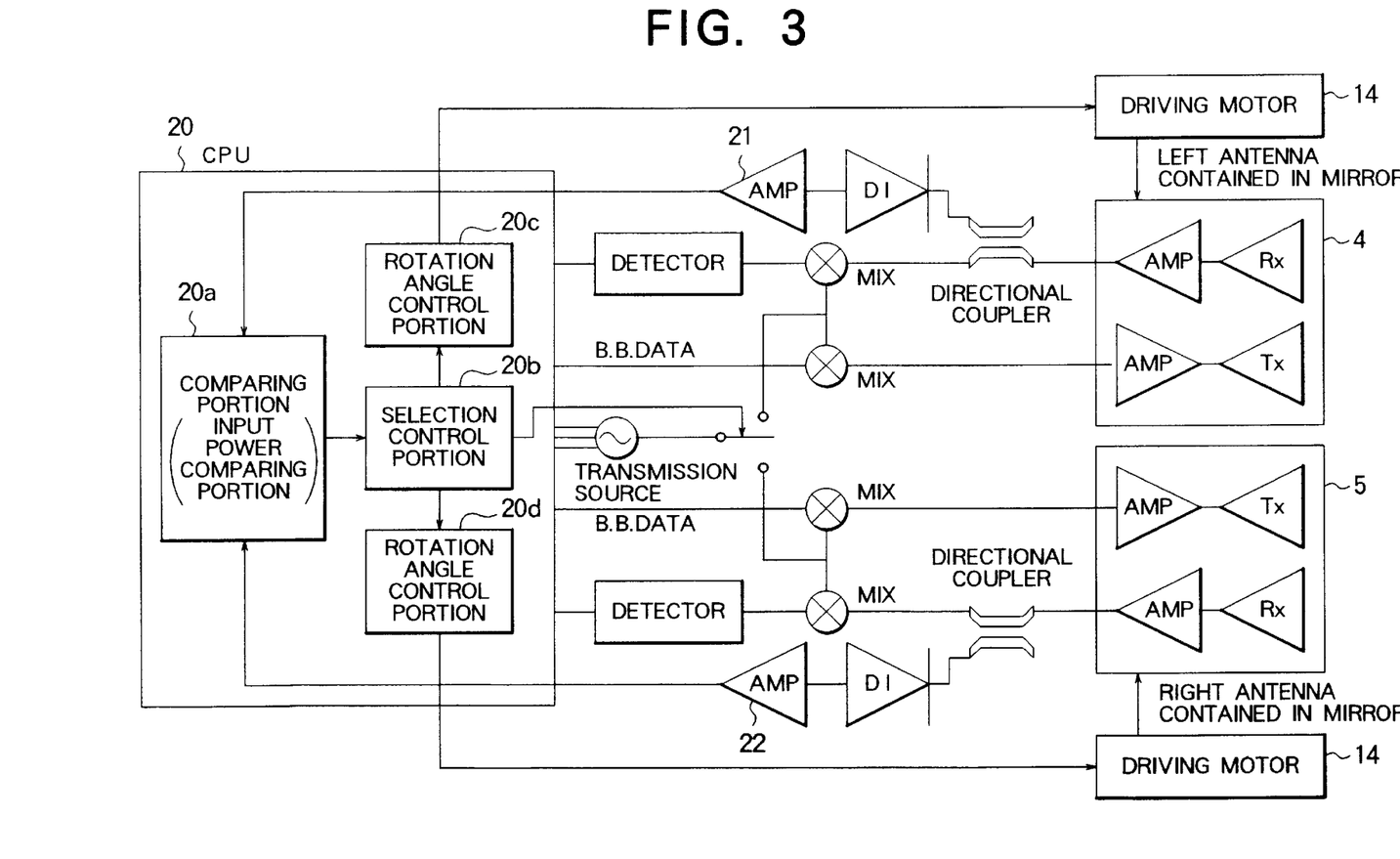
FIG. 3 is a block circuit diagram showing the vehicle antenna apparatus of this invention.

FIG. 3 is a block circuit diagram showing this vehicle antenna apparatus. The driving motors 14 are given control signals by rotation angle control portions 20c and 20d of CPU 20 and then drive the antennas 4 and 5 in such a way as to move upwardly, downwardly and laterally separately from each other. On the other hand, outputs of the antennas 4 and 5 are inputted to CPU 20 after amplified by amplifiers 21 and 22, respectively. In CPU 20, a comparison between the magnitudes of input power to the antennas 4 and 5 is made by a comparing portion 20a serving as the input power comparing portion. Further, a selection control portion 20b selects one of the antennas, which corresponds to higher input power. Namely, CPU 20 has diversity effects. Moreover, the selection control portion 20b uses the antenna 4 or 5, whose output is large, for communication. Furthermore, the selection control portion 20b gives the rotation angle control portion 20c or 20d a rotation command so as to turn the other antenna.

Figure 4:
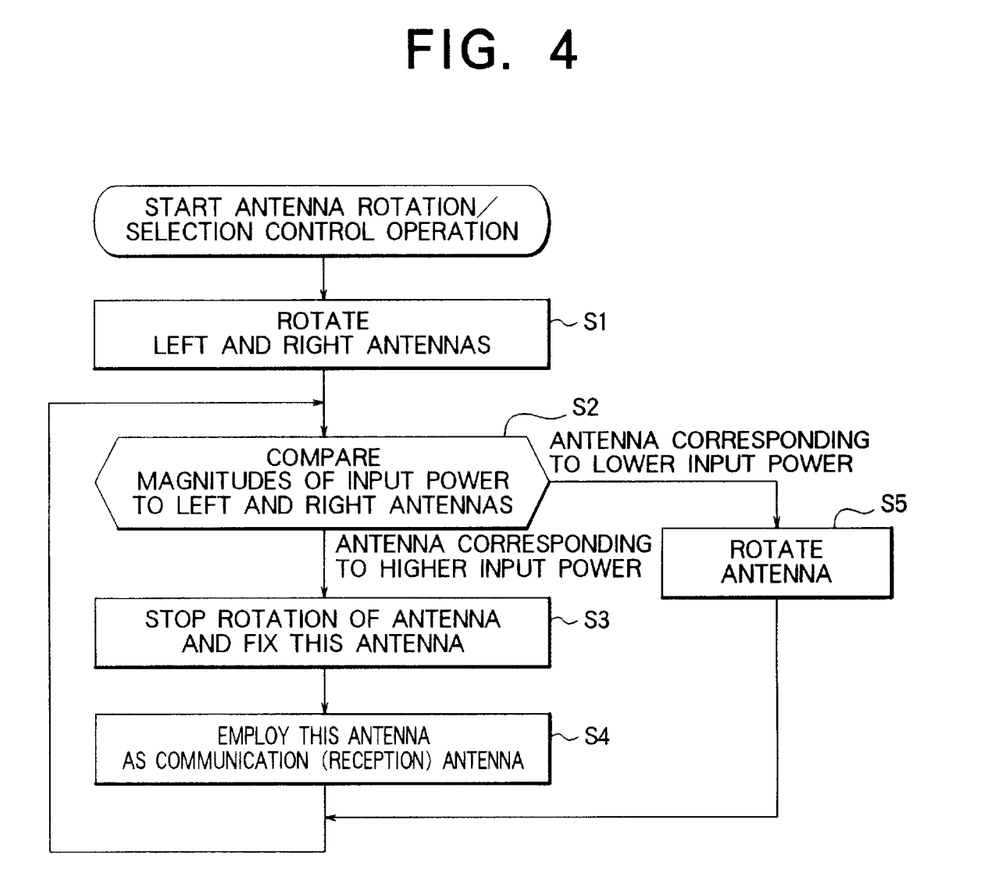
FIG. 4 is a flowchart illustrating an antenna rotation/selection operation of this vehicle antenna apparatus.

FIG. 4 is a flowchart illustrating an antenna rotation/selection operation of CPU acting as the control means. First, in step S1, CPU 20 causes the rotation angle control portions 20c and 20d to output control signals to the driving motors 14, respectively, so that the left and right antenna 4 and 5 are rotated. Thereafter, a comparison between the magnitudes of input power to these antennas is made in the comparing portion 20a in step S2. Then, the rotation of the antenna corresponding to higher input power is stopped at a position and is fixed thereat in step S3. Subsequently, such an antenna is selected or employed as an antenna for communication in step S4. Namely, communication is performed by using this antenna. On the other hand, the other antenna corresponding to lower input power remains rotating in step S5.

Thereafter, while communication is performed by using the fixed antenna, the other antenna is turned and the comparison between the magnitudes of input power to the antennas is succeedingly made in step S2. Then, if the input power to the rotated antenna is higher than that to the fixed antenna, the rotated antenna is stopped in step S3. Subsequently, this antenna is selected in step S4 as an antenna for communication. Moreover, the other antenna is rotated in step S5. Thence, a process consisting of steps S2 to S5 is repeatedly performed.

The vehicle antenna apparatus of such a configuration always obtains high input power. Thus, this apparatus prevents the reception levels of the antennas 4 and 5 from being reduced owing to the directivities of these antennas. Further, this apparatus always obtains stable input power from one of the antennas by fixing the one of the antennas. Furthermore, this apparatus seeks a higher reception level by rotating the other antenna.

Incidentally, in this embodiment, the antennas 4 and 5 are provided in the door mirrors. However, these antennas may be provided in the outer rear view mirrors (fender mirrors).

Embodiment 2

Figure 5:
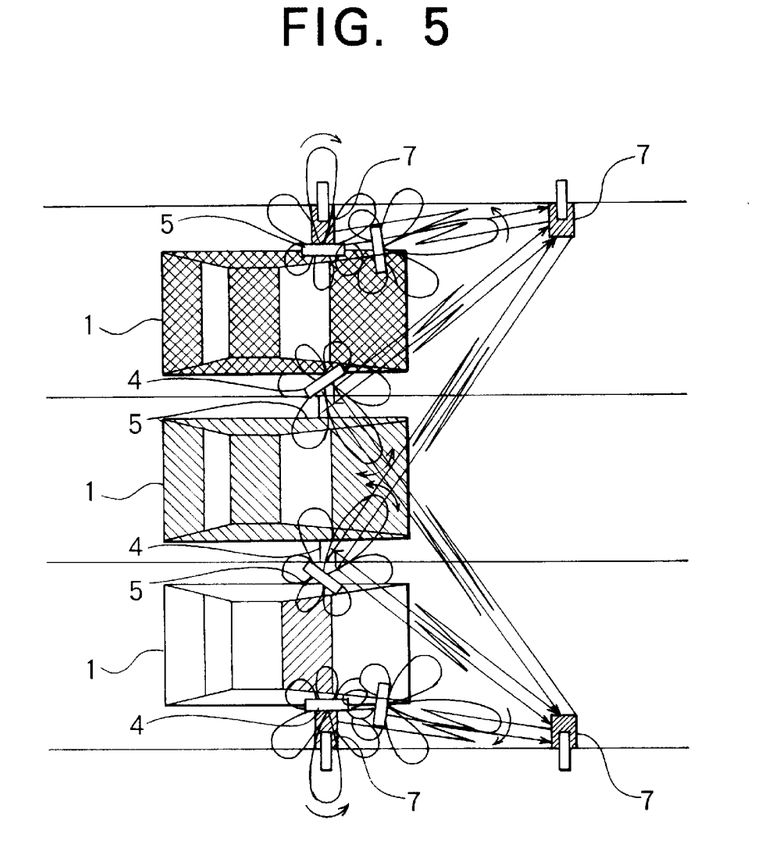
FIG. 5 is a top view of another embodiment of the vehicle antenna apparatus of this invention.
Figure 6:
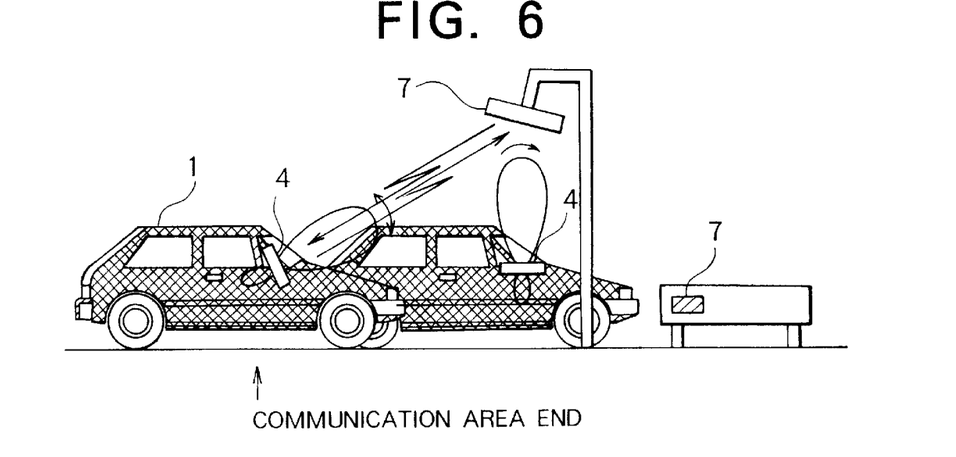
FIG. 6 is a side view of this embodiment of the vehicle antenna apparatus of this invention.

FIG. 5 is a top view of another embodiment of the vehicle antenna apparatus of this invention. FIG. 6 is a side view thereof. This embodiment is used for leaked coaxial cable (LCX) communication. Generally, among road antennas 7 to be used for LCX communication, some are disposed on posts and mounted high above roads, respectively, and some are mounted on guardrails, respectively. In the case of LCX communication, the communication between a vehicle 1 and a road device 8 is performed in a predetermined section between a position at a predetermined distance from the road antenna 7 and the position of this antenna. In this embodiment, communication from a vehicle 1 to the road antenna 7 disposed on the post is started at the end of the communication area provided before this antenna, as shown in FIG. 6. The rest of the configuration of this embodiment is nearly similar to the corresponding part of the configuration of "Embodiment 1".

Figure 7:
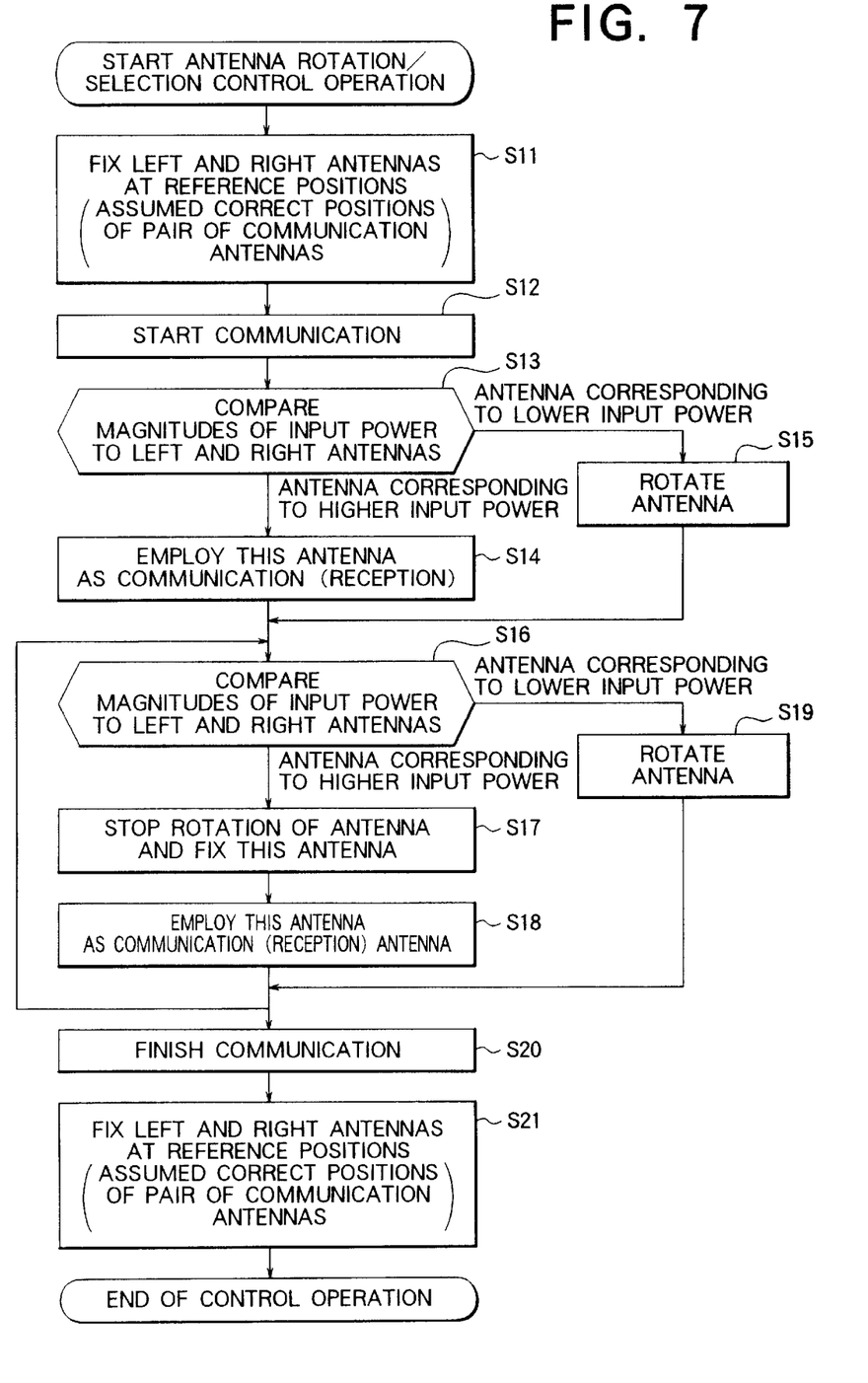
FIG. 7 is a flowchart illustrating an antenna rotation/selection operation of this embodiment.

FIG. 7 is a flowchart illustrating an antenna rotation/selection operation of CPU of "Embodiment 2". In this embodiment, first, in step S11, CPU 20 causes the left antenna 4 and the right antenna 5 to be fixed at reference positions (to be described in detail later) until communication is started. Further, when the communication is started in step S12, CPU 20 compares the magnitudes of input power to the left antenna 4 and the right antenna 5 in steps S13. Then, CPU 20 selects or employs the antenna corresponding to higher input power as an antenna to be used for the communication. Moreover, CPU 20 causes the antenna, which corresponds to lower input power, to rotate in step S15. Incidentally, in the case of this embodiment, a driven range, where the antenna is rotated, is predetermined.

Thereafter, while performing the communication by using the fixed antenna, CPU 20 causes the other antenna to rotate, and succeedingly compares the magnitudes of input power to the left and right antennas 4 and 5 in step S16. Then, if the input power to the rotated antenna is higher than that to the fixed antenna, CPU 20 stops the rotated antenna in step S17. Moreover, CPU 20 selects or employs this antenna in step S18 as an antenna for communication. Furthermore, CPU 20 causes the other antenna to rotate in step S19. Thence, a process consisting of steps S16 to S19 is repeatedly performed until the communication is finished. Thereafter, when the communication is finished in step S20, CPU 20 prepares for the start of the next communication by fixing the left antenna 4 and the right antenna 5 at the reference positions in steps S21.

Next, the reference positions and the driven ranges of the left antenna 4 and the right antenna 5 of this embodiment will be described hereinbelow. First, in a horizontal direction, the reference position of each of the antennas is set as a position in which the antenna is outwardly inclined at 45 degrees to the travelling direction of the vehicle. The driven range of each of the antennas is preliminarily determined as a range between a direction, in which the antenna is leftwardly turned from and perpendicular to the travelling direction of the vehicle, and a direction in which the antenna is rightwardly turned from and perpendicular to the travelling direction thereof. Namely, each of the antennas reciprocates within a 180-degree range.

On the other hand, in a vertical direction, the reference position of each of the antennas is set as a position where the antenna is placed at a communication start position in an end portion of the communication area and is directed to the road antenna 7 mounted on the post, namely, a position where the (vehicle) antenna placed at the end of the communication area is directed to the road antenna, which is mounted on the post, upwardly from the travelling direction of the vehicle, as shown in FIG. 6. The driven range of each of the antennas is preliminarily determined as a range between a direction, in which the antenna of the vehicle travelling on the leftmost or rightmost lane is directed to the top of the guardrail, and a direction in which the antenna of the vehicle located just under the road antenna 7 is directed to the road antenna 7, namely, an upwardly vertical direction from the road surface. Thus, each of the (vehicle) antennas reciprocate in this range.

In the case of the vehicle antenna apparatus of such a configuration, a position, where the road antenna 7 to be used for LCX communication is mounted, is assumed. Further, the reference positions of the antennas 4 and 5 are set correspondingly to the assumed position of the road antenna 7. Moreover, each of the antennas 4 and 5 is fixed at the corresponding one of the reference positions until the vehicle reaches the communication start position. Furthermore, the driven ranges of the antennas 4 and 5 are limited when communication is commenced. Thus, this vehicle antenna apparatus seeks a high reception level in a short time and obtains more stable input power.

Embodiment 3

Figure 8:
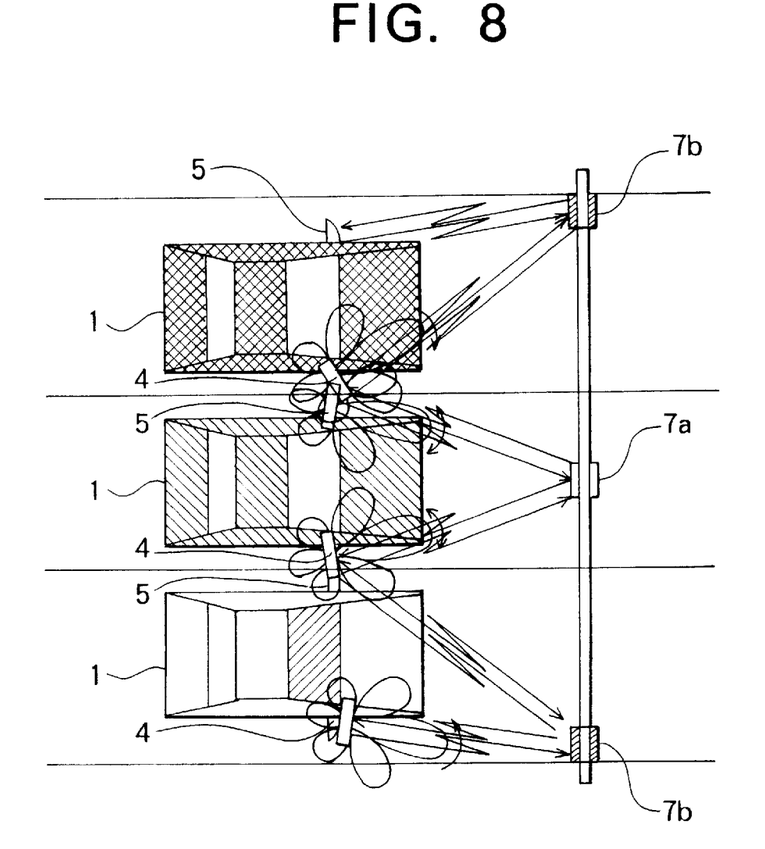
FIG. 8 is a top view of still another embodiment of the vehicle antenna apparatus of this invention.
Figure 9:
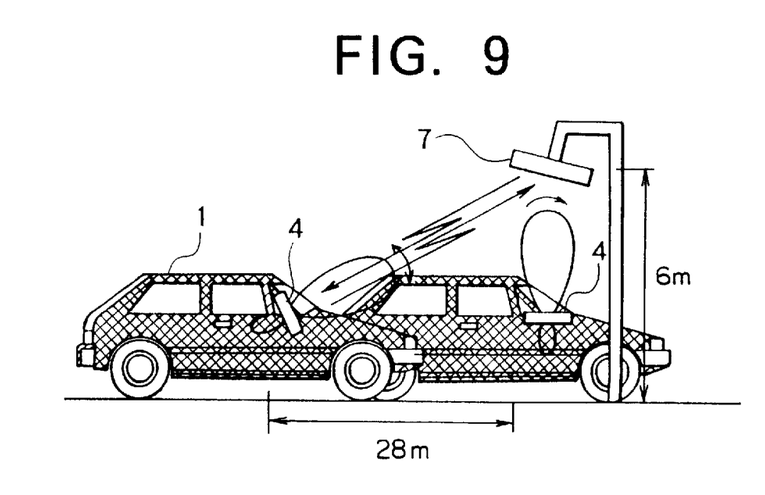
FIG. 9 is a side view of this embodiment of the vehicle antenna apparatus of this invention.

FIG. 8 is a top view of this embodiment of the vehicle antenna apparatus of this invention. FIG. 9 is a side view thereof. This embodiment is used for electronic toll collection (ETC) communication. Generally, road antennas to be used for ETC communication are mounted on a support built over a road. Particularly, the road antennas are installed thereon above the central portion of the road and above both roadsides.

The reference positions and the driven ranges of the left and right antenna 4 and 5 of this embodiment in the case, where these antennas are used for ETC communication, will be described hereinbelow. First, in a horizontal direction, the reference position of each of the antennas is set as a position in which the antenna of a vehicle travelling on the central lane is directed to a road antenna 7a placed above the central portion of a road when the vehicle reaches the communication start position. The driven range of each of the vehicle antennas 4 and 5 is preliminarily determined as a range between directions, in which the vehicle antenna is directed to road antennas 7b provided on both roadsides, respectively.

On the other hand, in a vertical direction, the reference position of each of the antennas is set as a position where the antenna of the vehicle located at a communication starting point at a distance of 28 meters away from the road antenna 7 is directed to this road antenna 7 mounted at a height of 6 meters above the road, as shown in FIG. 9, namely, a position where the (vehicle) antenna is upwardly directed at 11 degrees away from the travelling direction of the vehicle. The driven range of each of the vehicle antennas is preliminarily determined as a range between a direction, in which the antenna of the vehicle is directed at such an angle away from the travelling direction of the vehicle, and a direction in which the antenna of the vehicle located just under the road antenna 7 is directed to the road antenna 7, namely, an upwardly vertical direction from the road surface. Thus, each of the (vehicle) antennas reciprocates in this range.

The rest of the configuration of this embodiment is similar to the corresponding part of the configuration of "Embodiment 2".

In the case of the vehicle antenna apparatus of such a configuration, positions, where the road antennas 7a and 7b to be used for ETC communication are mounted, are assumed. Further, the reference positions of the antennas 4 and 5 are set correspondingly to the assumed positions of the road antennas 7a and 7b. Moreover, each of the antennas 4 and 5 is fixed at the corresponding one of the reference positions until the vehicle reaches the communication start position. Furthermore, the driven ranges of the antennas 4 and 5 are limited when communication is started. Thus, this "Embodiment 3" obtains advantageous effects similar to those of "Embodiment 2".

Although the preferred embodiments of this invention have been described above, it should be understood that this invention is not limited thereto and that other modifications will be apparent to those skilled in the art without departing from the spirit of the invention.

The scope of this invention, therefore, is to be determined solely by the appended claims.

What is claimed is:

1. A vehicle antenna apparatus comprising:

a pair of antennas respectively provided in left and right outside rear view mirrors;

driving means, connected to said pair of antennas, respectively, for changing orientations of said pair of antennas; and control means having an input power comparing portion for making a comparison between a magnitude of input power to one of said pair of antennas and a magnitude of input power to the other of said pair of antennas, said control means being operative to select one of said pair of antennas, the input power to which is higher the input power to the other of said pair of antennas, as an antenna for communication, said control means being operative to control said driving means in such a manner as to drive said pair of antennas so that an orientation of the selected one of said pair of antennas corresponding to higher input power is fixed and an orientation of the other antenna corresponding to lower input power is changed.

2. The vehicle antenna apparatus according to claim 1, wherein the orientation of said other antenna corresponding to the lower input power is changed within a predetermined driven range.

3. The vehicle antenna apparatus according to claim 1, wherein said pair of antennas are fixed at reference position until a vehicle reaches a communication start position, and wherein, when said vehicle reaches the communication start position and communication is then started, said selected one of said pair of antennas corresponding to the higher input power is fixed and said other antenna corresponding to the lower input power is driven.

* * * * *